(12) United States Patent
Schmidt et al.

(10) Patent No.: US 7,357,235 B2
(45) Date of Patent: Apr. 15, 2008

(54) AUTOMATIC GEARBOX WITH A HYDRAULICALLY ACTUATED SHIFTING ELEMENT

(75) Inventors: Thilo Schmidt, Meckenbeuren (DE); Christian Popp, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 168 days.

(21) Appl. No.: 10/563,386

(22) PCT Filed: Jul. 1, 2004

(86) PCT No.: PCT/EP2004/007139

§ 371 (c)(1),
(2), (4) Date: Jan. 5, 2006

(87) PCT Pub. No.: WO2005/008096

PCT Pub. Date: Jan. 27, 2005

(65) Prior Publication Data

US 2006/0163020 A1    Jul. 27, 2006

(30) Foreign Application Priority Data

Jul. 11, 2003    (DE) ................. 103 31 370

(51) Int. Cl.
*F16D 11/00* (2006.01)
(52) U.S. Cl. ..................... 192/53.1; 192/48.3
(58) Field of Classification Search ............... 192/48.3, 192/48.8, 53.1
See application file for complete search history.

(56) References Cited

U.S. PATENT DOCUMENTS

| | | | |
|---|---|---|---|
| 2,353,137 A | 7/1944 | Banker | |
| 2,763,162 A | 9/1956 | Herndon | |
| 5,507,372 A * | 4/1996 | Boardman et al. | 192/3.31 |
| 5,667,052 A * | 9/1997 | Richardson | 192/85 R |
| 5,943,911 A * | 8/1999 | Beckerman | 74/333 |
| 5,975,263 A * | 11/1999 | Forsyth | 192/53.32 |
| 6,085,880 A | 7/2000 | Kuhn et al. | |

FOREIGN PATENT DOCUMENTS

| | | |
|---|---|---|
| DE | 738 514 | 7/1943 |
| DE | 25 38 781 | 3/1977 |
| DE | 198 22 193 A1 | 11/1999 |
| DE | 100 40 116 A1 | 2/2002 |
| DE | 102 44 523 A1 | 4/2004 |
| FR | 2 551 163 | 1/1985 |

* cited by examiner

*Primary Examiner*—Ha D. Ho
(74) *Attorney, Agent, or Firm*—Davis Bujold & Daniels, P.L.L.C.

(57) ABSTRACT

An automatic gearbox for a vehicle with at least one hydraulically actuated shifting element made as a transmission brake or transmission clutch. The shifting element has an inner disk carrier and an outer disk carrier where inner disks and outer disks are arranged rotationally fixed but axially displaceably. The disks are arranged in alternating sequence one after the other to form a disk pack which can be acted upon by an actuator with an axial actuation force to engage the shifting element, and in which one disk carrier is connected to one of a non-rotating or a rotating gearbox component and the other disk carrier can be connected, via a synchronization device, to a rotating gearbox component. To reduce the shifting time that can be achieved with such a gearbox when carrying out a transmission ratio change process, a synchronization device is actuated by way of a second actuator.

19 Claims, 5 Drawing Sheets

AUTOMATIC GEARBOX WITH A HYDRAULICALLY ACTUATED SHIFTING ELEMENT

This application is a national stage completion of PCT/EP2004/007139 filed Jul. 1, 2004 which claims priority from German Application Ser. No. 103 31 370.2 filed Jul. 11, 2003.

FIELD OF THE INVENTION

The invention concerns an automatic gearbox with at least one hydraulically actuated shifting element formed as a transmission brake or transmission clutch.

BACKGROUND OF THE INVENTION

It is known that in automatic variable-speed gearboxes with planetary gearset systems, disk clutches and disk brakes are used for engaging the individual gears. These are actuated by pressure medium operated piston-cylinder arrangements whose pressure medium supply is controlled by a control and regulation unit.

Such transmission shifting elements, however, besides certain advantages, also have the disadvantage of causing comparatively high power loss even when not engaged because of the relative rotation between the steel disks and lining disks. This power loss can only be reduced by having as large a separation as possible between the steel and lining disks, which sums up to give the so-termed air clearance.

As a rule, this necessary air clearance is adjusted by a restoring spring that acts upon the shifting element in the opening direction of the actuation piston. However, this creates the disadvantage that owing to the force of the restoring spring the piston-cylinder arrangement has to be made larger, and when the actuation piston is acted upon by a clutch-closing pressure the actuation path corresponding to the air clearance first has to be covered in a pre-filling phase before the disks come into force-transferring engagement. In typical automatic gearboxes it takes approximately 200 ms to cover the air clearance path, and this is perceived as a long time particularly by drivers of sports vehicles. Especially in vehicles having automatic gearboxes with sequential shift systems, in which the transmission gears of the automatic gearbox can be engaged manually by means of a trip-switch, such shifting delays are complained of as slowness of the reaction time.

Accordingly in the prior art, it has been proposed to make use of disk clutches with shifting sleeves and synchronization devices known from manual countershaft transmissions, by means of which in the open condition the disk clutch can be disengaged cleanly and free from any drag torque from the rotating gearbox components with which it is connected in the engaged condition.

This also has the advantage that the actuation piston then needs no air clearance and a restoring spring can be omitted. Advantageously, the aforesaid dead time of up to 200 ms during a transmission ratio change process then no longer occurs.

The rotation speed difference between the rotating transmission component and the component of the transmission shifting element to be driven when the latter is engaged is first overcome by way of the synchronizing device, so that thereafter, by an axial displacement of a shifting sleeve, a positive-lock connection is formed between the components in such manner that the drive torque can be transferred via the shifting sleeve. Once the speed equalization has taken place and the shifting sleeve connection has been formed, the gear and load synchronization usual in gearshift processes takes place by pressurizing the clutch piston that acts on the clutch disks.

Against this background, a gearbox is known from DE 100 40 116 A1, in which a positive-lock clutch is provided between an inner disk carrier of a disk brake and a planetary support of a planetary gearset. This positive-lock clutch is opened when the disk brake is open to uncouple transmission components from the disk brake, in order to reduce disadvantageous drag torques.

If it becomes necessary to close the disk brake, the positive-lock clutch is closed without force by an axial piston so that the transmission components, in this case the planetary support and the transmission components connected thereto, are coupled to an inner disk carrier of the disk brake.

Then a disk pack of the disk brake is acted upon by the axial piston with an adjustable closing force so that by virtue of this pressurization of the axial piston the brake torque can be gently and continuously increased without any appreciable engagement jerk.

A disadvantage of this gearbox, however, is that the positive-lock clutch between the inner disk carrier of the disk brake and the planetary support of the planetary gearset can only be closed comfortably when the inner disk carrier and planetary support are rotating at the same speed.

In contrast, if there is a rotation speed difference between the inner disk carrier and the planetary support, the positive-lock clutch cannot be engaged or only so with high expenditure of force and at the same time high noise emission.

To minimize the force used and the noise emitted when the positive-lock clutch is closed, it is necessary for the inner disk carrier and the planetary support to be at rest, which distinctly limits the utility range of this system.

Furthermore from the not previously published DE 102 44 523 A1, a gearbox is known with which the above disadvantages are avoided. According to this prior art, it is proposed to equip a gearbox with an additional synchronization device by way of which, before closing, a clutch mechanism is synchronized in relation to rotation speed by positive locking. This makes it possible to close the clutch mechanism using little force and without disturbing noise emission.

Although the last-mentioned gearbox represents a clear advance compared with the prior art first mentioned, there is still a need for further improvement. Namely, with both actuation arrangements, it is disadvantageous that in both a closing and an opening process the actuation piston for the disk clutch has to move through a comparatively large regulating distance, which is noticeable as a somewhat longer time required to carry out a transmission ratio change process in the gearbox. This is mainly because the actuation piston first has to move through the synchronization path of the synchronizing device before, by further piston actuation, the disk pack can be compressed or released in the closing or opening direction, respectively.

Against this background the purpose of the present invention is, therefore, to propose an automatic gearbox of the type described, having at least one transmission shifting element formed as a transmission clutch or transmission brake with a synchronization device, which can be actuated more rapidly than those of the prior art.

SUMMARY OF THE INVENTION

The invention is based on the recognition that actuation of the synchronization device of such a shifting element independently of the compression of the shifting element disks enables an appreciable time gain when carrying out a transmission ratio change process.

According to the invention, the automatic vehicle gearbox, therefore, comprises at least one shifting element formed as a transmission brake or transmission clutch with an inner disk carrier and an outer disk carrier on which, respectively, inner disks and outer disks are arranged rotationally fixed and axially displaceably one after the other in alternation, so that a disk pack is formed. One of the two disk carriers is connected with transmission components that can or cannot rotate relative to one another, while the other disk carrier can be connected, via a synchronization device, to transmission components that can rotate relative to one another. To close this transmission shifting element, the clutch disks can be acted upon by an actuator with an axial actuation force. For this transmission shifting element, it is now provided that the synchronization device can be actuated by way of a second, separate actuator.

In an advantageous embodiment of the invention, the synchronization device also comprises a positive-locking element and/or a frictional element.

The frictional element is preferably in the form of a synchronization ring, which can be brought into active connection with a synchronization area on one of the two disk carriers.

As regards the positive-locking element, it is preferably provided that this comprises a sliding sleeve, which is fitted rotationally fixed, but axially displaceably on outer teeth on the rotating or non-rotating transmission component in such a manner that when rotation speed equality has been achieved between the fixed and rotating transmission component, the sleeve can be slid onto the synchronization area of one of the disk carrier with positive locking.

To effect its axial movement, the sliding sleeve can be actuated by the second actuator which, in this example, embodiment of the invention comprises a shifting fork of a positioning device, which engages in a circumferential groove of the sliding sleeve.

In another, particularly space-saving variant embodiment of the invention, the second actuator is formed as a second actuation piston which, together with a first actuation piston serving to compress the clutch disks, can move axially within a common actuation cylinder. This actuation cylinder preferably provides the same pressure space for both actuation pistons, so that both actuation pistons can be acted upon by the same actuation pressure p_k. Different adjustment forces are obtained by having different pressurization surface areas of the two pistons.

However in the common actuation cylinder for the two actuation pistons there can also be separate respective pressure spaces so that the actuation pistons can be acted upon by a pressure medium with equal or different actuation pressures.

In the variant with only one pressure space for both actuation pistons, in order to actuate the synchronization device before the disks are compressed, it is appropriate for the first actuation piston to be associated with a first spring and the second actuation piston with a second spring which, in each case, act on the end facing away from the pressure space.

When the shifting element is a transmission brake, these springs rest at their respective other ends against a component fixed on the housing and, when the shifting element is a transmission clutch, they rest against a rotating transmission component and they have different spring characteristics. The restoring force of the first spring is larger than the restoring force of the second spring so that when an actuation pressure p_k acts on the two actuation pistons the first piston, which actuates the synchronization device, is displaced axially first and then the second piston which compresses the clutch or brake disks.

As regards the positive-locking element of the synchronization device, it can be provided that the sliding sleeve is guided axially on inner teeth of the inner disk carrier and is axially displaceably in active connection with the second actuation piston via a connecting element.

In another embodiment of the invention, a first synchronization area is formed on the radially inward-facing side of an outer disk carrier and a second synchronization area is present on the end of the second actuation piston facing away from the pressure space, which co-operates with the first synchronization area to synchronize the rotation speeds.

Another variant of the invention provides that a sliding sleeve is fitted axially displaceably on the outer circumference of the first actuation piston. This sleeve is in active connection with the second actuation piston. Here, the second actuation piston is arranged radially outside the sliding sleeve and together with the latter in the same pressure cylinder as the first actuation piston.

On its outer circumference, the sliding sleeve has axially directed outer teeth on which are arranged an axially displaceable and rotationally fixed synchronization ring.

Furthermore in this synchronization device, an axially directed toothed area is provided on a synchronization area on the inner periphery of the outer disk carrier in which the outer teeth of the sliding sleeve can engage with positive locking.

To ensure particular reliability in the respect that the compression of the clutch or brake disks does not take place until the synchronization device has equalized rotation speeds between the transmission components rotating relative to one another and at rest, a locking device can be formed on the inner periphery of the sliding sleeve, which only allows axial displacement of the first actuation piston after the speed equalization has been achieved and when a positive-lock connection has been formed between the sliding sleeve and the outer disk carrier.

To leave free sufficient structural space and room for movement for the synchronization device component and for the locking device if provided, it can finally be provided that an axial projection directed away from the pressure space of the piston-cylinder arrangement is formed on the first actuation piston, by way of which the inner or outer disks of the disk clutch or disk brake, respectively, can be acted upon with the actuation force $F_1$ of the first actuation piston.

It can also be provided that, instead of a synchronization ring, an additional small hydraulically or electro-mechanically operated disk clutch is arranged between the disk carrier and the transmission component that rotates or is fixed on the housing.

Another advantageous embodiment of the invention provides that a hydrodynamical locking device for the first actuation piston is present, which is released when frictional and/or positive locking connection exists between the shifting element component to be brought to rest and a transmission component fixed on the housing.

It is additionally regarded as favorable if an electric switch, by way of which a lubricant flow can be switched on or off, can be actuated mechanically by at least one of the two actuation pistons or by the second actuator.

Alternative to this, it is also possible for an electric switch, by way of which a lubricant flow can be switched on or off, to be mechanically actuated by a hydraulic slider (hydraulic actuation means) that can be actuated by one of the two actuators.

Finally, instead of transmission brakes, the invention can also be used advantageously for transmission clutches.

BRIEF DESCRIPTION OF THE DRAWINGS

The invention will now be described, by way of example, with reference to the accompanying drawings in which.

DETAILED DESCRIPTION OF THE INVENTION

Fundamentally, the invention can be implemented with both transmission brakes and transmission clutches which are used as shifting elements in an automatic gearbox. In presenting example embodiments of the invention, however, only disk brakes will be shown since the structure of disk clutches constructed according to the invention differs only very little from these disk brakes. In the disk brakes, the outer and inner disk carriers rotate with a rotation speed relative to one another when the clutch is open, as is known. When the clutch is closed, the rotation speeds are equalized. However, the restoring springs for the automatic opening of the clutch after the decrease of a clutch actuation pressure do not in this case rest against a static transmission component (when a rotating bearing relative to a component fixed to the housing is present) but rather, against correspondingly rotating components. Thus, the pressure pistons and the restoring springs associated with them rotate at the same speed.

Figure 1:
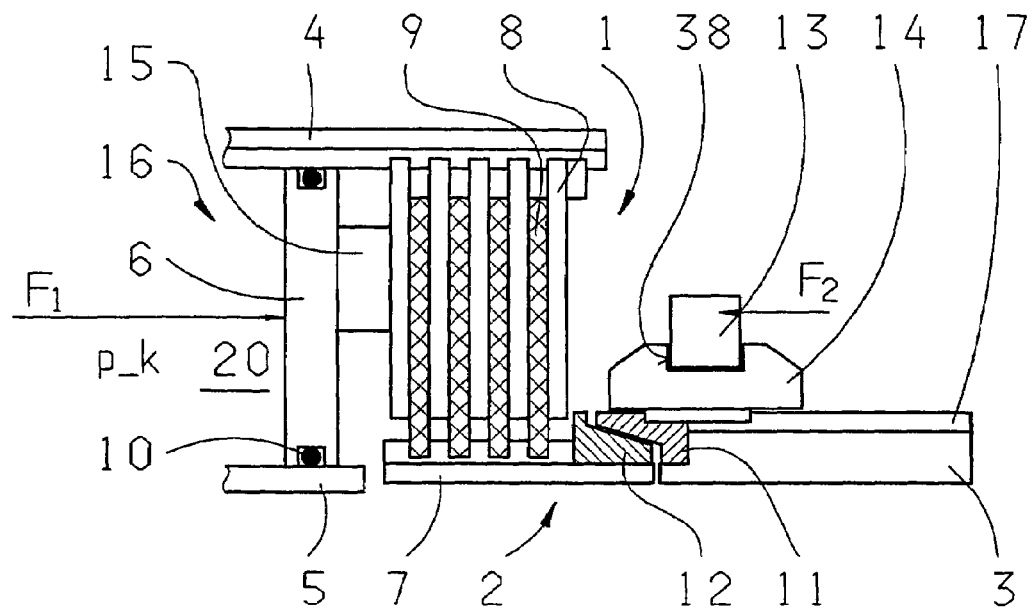
FIG. 1 is a schematic cross-section through an automatic gearbox in the area of a disk brake with an actuation device for the brake disks and a separate actuation device for the synchronization device.

FIG. 1 now shows in schematic form a section of an automatic gearbox in the area of a disk brake 1. The disk brake 1 consists essentially of an outer disk carrier 4 arranged rotationally fixed relative to a gearbox housing (not shown here), on which radially inward extending steel disks 8 are arranged such that they can be displaced axially, but are rotationally fixed.

Into the spaces between the outer disks 8 project outward-extending inner disks 9 made as disks of brake lining material, which are pushed axially displaceably, but rotationally fixed onto an inner disk carrier 7 which is rotatably mounted. To transmit a braking torque from the rotatable inner disk carrier 7 to the rotationally fixed outer disk carrier 4, the brake disks 8, 9 can be pressed together by a first actuator 16 with a force $F_1$ which, in this example embodiment, is produced by a piston-cylinder unit shown in the left half of FIG. 1.

This actuator 16 consists essentially of a pressure cylinder 5 and a first actuation piston 6 held axially displaceably therein, between which a pressure space 20 is enclosed. In this pressure space 20 there is a hydraulic or pneumatic pressure medium which can be pressurized by a pressure generation device (not shown here) to an actuation pressure p_k determined by a control and regulation device. In this, the pressure space 20 is preferably sealed relative to the internal pressure space by a sealing ring 10a, 10b.

In addition, in this example embodiment, a contact ring 15 is formed on the end face of the actuation piston 6 remote from the pressure space, which acts essentially centrally on the disk pack 8, 9.

In the right half of FIG. 1, a rotatable gearbox component 3 is shown, which comprises frictional and positive-locking means of a synchronization device 2. In particular, these include a synchronization ring 11 mounted on the component 3 and comprising a synchronization ramp extending radially inwards, and a sliding sleeve 14 which is arranged rotationally fixed, but axially displaceably on outer teeth 17 of the component 3. To displace the sliding sleeve 14 axially, it is acted upon by a second actuator 13 with a displacement force $F_2$.

In this example embodiment of the invention, the second actuator 13 consists of a shifting fork or carrier, which engages in a circumferential groove 38 of the sliding sleeve 14 and is actuated by a positioning device (not shown here).

Opposite the synchronization ramp of the synchronization ring 11 is a radially inward-directed synchronization ramp on a synchronization area 12, which is formed on the outer periphery of the inner disk carrier 7.

To actuate the disk brake 1, according to the basic concept of the invention, the sliding sleeve 14 is first pushed by the second actuator 13 with an actuation force $F_2$ to the left in the direction towards the clutch disk pack 8, 9, so that with its synchronization ramp the synchronization ring 11 comes up against the synchronization ramp of the synchronization area 12 on the inner disk carrier 7.

Thereby in a manner known as such, the inner disk carrier 7 is brought to the rotation speed of the rotating component 3, so that a frictional connection between the inner disk carrier 7 and the component 3 is formed.

Thereafter, the sliding sleeve 14 is pushed axially far enough towards the disk pack 8, 9 for its inner teeth to engage with positive locking in the outer teeth on the synchronization area 12 of the inner disk carrier 7.

As soon as this positive-lock connection has been formed, the pressure p_k in the actuation cylinder is increased sufficiently for the first actuation piston 6 to move to the right toward the disk pack 8, 9 and act upon it with the desired actuation force $F_1$. Thereby, the outer disks 8 are pressed against the inner disks 9 so that their rotation speed, as well as the rotation speed of the inner disk carrier and the component 3 positively locked thereto, is reduced to zero.

In addition, in the non-engaged condition, the first actuation piston 6 can be positioned close to the brake disks 8, 9 with a very small clearance 29, since owing to the uncoupling of the inner disk carrier 7 from the rotating component 3 there will be no appreciable drag losses between the outer disks 8 and the inner disks 9.

Figure 2:
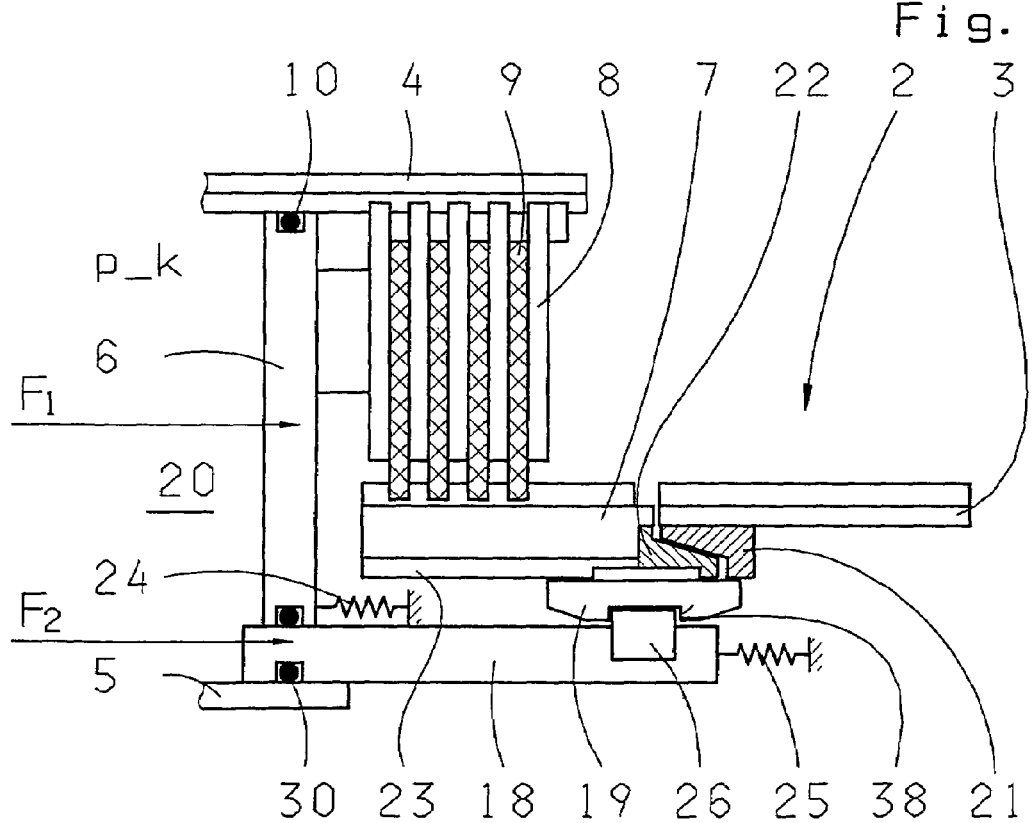
FIG. 2 is a disk brake with two actuation pistons guided within an actuation cylinder and with a sliding sleeve.

Considering the example of a transmission brake, FIG. 2 shows that the principle described, according to the invention, can also be applied in another design embodiment. In this variant, besides the first actuation piston 6, the actuation cylinder 5 also accommodates a second actuation piston 18, both preferably being acted upon by the same actuation pressure p_k prevailing in the pressure space 20 of the actuation cylinder 5. Both pistons 6, 18 are sealed relative to one another and relative to the cylinder 5 by seals 10, 30 against the internal pressure space (not indexed more precisely).

In accordance with the piston areas directed toward the pressure space 20, actuation forces $F_1$ and $F_2$ are produced, which may be different or of the same size.

Against the end surfaces of the two actuation pistons 6, 18 facing away from the pressure space 20 of the actuation cylinder 5, there act restoring springs 24 and 25 which, at their other ends, rest against components fixed to the gearbox housing. The purpose of these two springs 24, 25 is to act upon the two actuation pistons with restoring forces which, in cooperation with the actuation forces $F_1$ and $F_2$ that act on the actuation pistons 6, 18, ensure that at a given actuation pressure p_k in the pressure chamber 20 the smaller, second actuation piston 18 is actuated first in order to synchronize the rotation speeds, before the larger, first actuation piston 6 acts on the disk pack 8, 9.

In the example embodiment chosen here, the piston areas are chosen such that the first spring 24 that acts on the first actuation piston 6 produces a larger restoring force than the second spring 25 that acts on the second actuation piston 18. In one example embodiment, the restoring force of the first spring 24 amounts to a control pressure equivalent of 1 bar, while that of the second spring acting on the actuation piston 18 for the synchronization device 2 is 0.5 bar.

As shown clearly by FIG. 2, at the end of the second actuation piston 18 remote from the pressure space is arranged a connection element 21 which engages in a circumferential groove 38 of a sliding sleeve 19, by way of which the sliding sleeve 19 can be displaced by the axial movement of the second actuation piston 18.

In this example embodiment of the invention, the sliding sleeve 19 is arranged such that it can be axially displaced with its outer teeth engaged with inner teeth 23 of the inner disk carrier 7.

In the area of the end of the inner disk carrier 7 remote from the pressure space, in this case as well a synchronizing ring 22 is arranged, which can be displaced by the sliding sleeve 19 toward a synchronization area 26 of the rotating component 3.

To actuate the synchronization device 2 described, a pressure p_k is produced in the pressure space 20 of the pressure cylinder 5, which is high enough to push the second piston 18 outward in the pressure cylinder 5 against the restoring face of the second restoring spring 25. This presses together the synchronization surfaces of the synchronization ring 22 and the synchronization area 26, whereby the rotating component 3 is braked to rest. Thereafter, the sliding sleeve 19 is pushed over the component 3 to form a positive-lock connection between the latter and the inner disk carrier 7.

Only after the formation of this positive-lock connection is the pressure p_k in the pressure space 20 increased until the first actuation piston 6 is pushed outward in the actuation cylinder 5 against the action of the first restoring spring 24 and pressed against the disk packs 8, 9.

Preferably, the piston surfaces of the two actuation pistons 6, 18 and the restoring forces of the two springs 24, 25 are chosen such that the same actuation pressure p_k acts on both actuation pistons.

Here it is regarded as advantageous if, during the actuation movement of the second piston 18 to produce the frictional and positive-locking connection between the components, the first actuation piston 6 already moves slightly toward the disk packs 8, 9 so that the dead time for closing the clutch is reduced still further.

Figure 3:
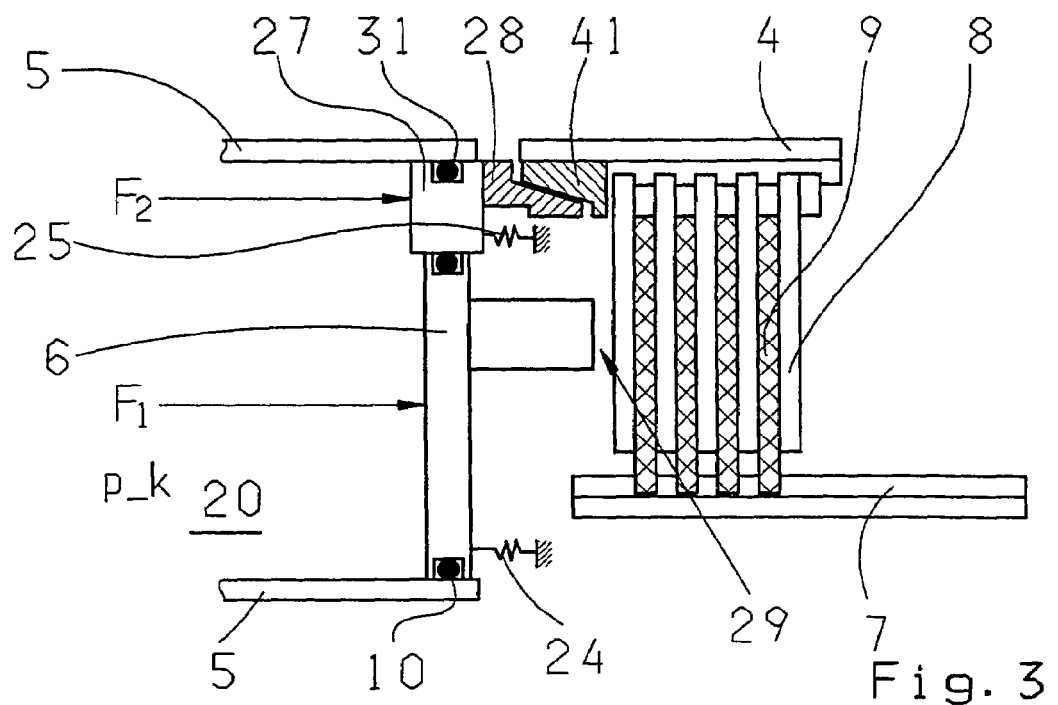
FIG. 3 is a disk brake with two actuation pistons as in FIG. 2, but with no sliding sleeve.

Another example embodiment of the invention, which concerns a transmission brake, is shown in FIG. 3, in which no positive-lock connection is formed between a rotating and a non-rotating component. In this disk brake, the inner disk carrier 7 forms the rotating component, which by virtue of insufficient mechanical or viscous separation between its inner disks 9 and the outer disks 8 arranged on the outer disk carrier 4, produces drag losses owing to which, ultimately, the outer disk carrier 4 rotates about a center of rotation (not shown here) with the same speed as the inner disk carrier 7.

In this gearbox variant, a second actuation piston 27 is arranged in the actuation cylinder 5 axially movably on the radially outer circumference of the first actuation piston 6 and sealed against it by a seal 31.

In this example embodiment, at its end near the pressure space the outer disk carrier 4 has a synchronization area 41 with a radially inward-facing synchronization ramp, against which a radially outward-facing synchronization ramp of a synchronization ring 28 can be pressed. For this, the second actuation piston 27 is pressed with an actuation force $F_2$ onto the synchronization area 41 of the outer disk carrier 4 by the pressure p_k in the pressure space 20 and against the restoring force of the second restoring spring 25, until the outer disk carrier 4 is completely braked by the friction occurring during this.

The time now following, during which drag losses can occur between the stationary outer disk carrier 4 and the rotating inner disk carrier 7, is comparatively short since the first actuation piston 6, because of the very small clearance 29, need only cover a small distance before it can act on the disk pack 8, 9.

The first actuation piston 6, overcoming the restoring force of the second spring 24 acting upon it against the closing movement of the piston 6, has then approached the disk pack 8, 9 sufficiently for the outer disks 8 to be pressed against the inner disks 9 with a force $F_1$ such that the inner disk carrier 7 too is braked to rest. In this case too, it is provided that the restoring force of the second restoring spring 25 that acts on the second actuation piston 27 is smaller than the restoring force of the first restoring spring 24 acting on the first actuation piston.

Figure 4:
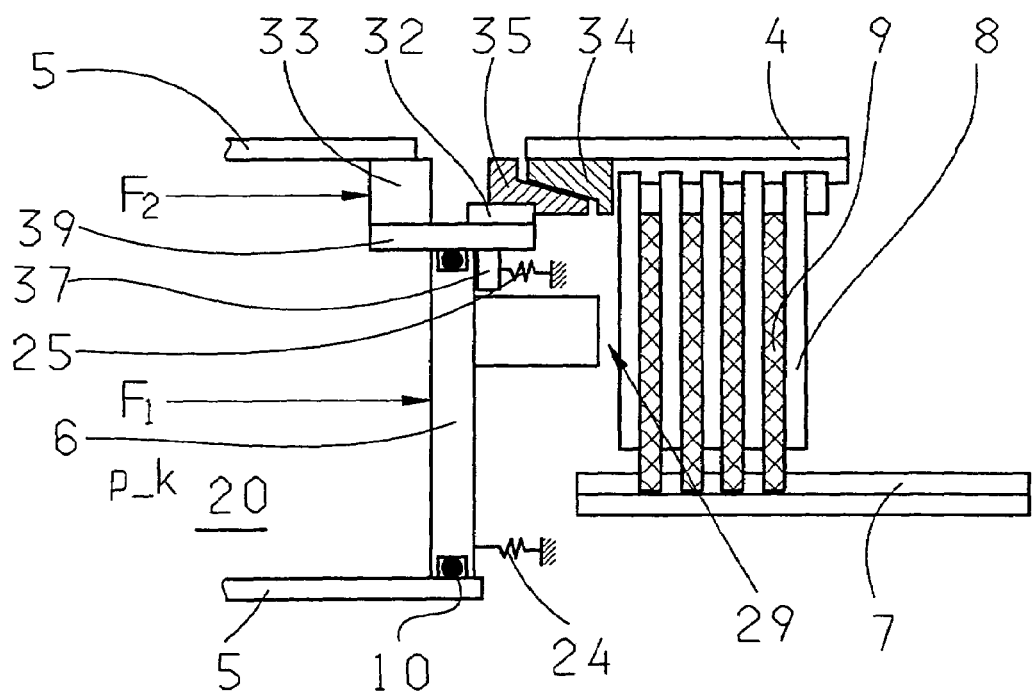
FIG. 4 is a representation as in FIG. 3, but with a sliding sleeve and locking device for one of the two actuation pistons.

A variant of the disk brake just explained, with its association actuation and synchronization device, is illustrated in FIG. 4. In this, however, a sliding sleeve 39 is additionally arranged between the first actuation piston 6 and a second actuation piston 33, and the sliding sleeve 39 is in active connection with the second actuation piston 33 in such manner that it can be displaced axially by the piston 33. In the simplest case, the sliding sleeve 39 is an integral part of the second actuation piston 33, although this demands very sensitive actuation control.

The sliding sleeve 39 is now formed such that on its outer periphery there are outer teeth (carrier teeth) 32, on which a synchronization ring 35 is fitted. This synchronization ring 35 has a radially outward-facing synchronization ramp which can be pressed against a radially inward-facing synchronization ramp formed on a synchronization area 34 on the inner periphery of the end of the outer disk carrier 4 near the pressure space.

Furthermore, on the radially innermost end of the synchronization area 34 of the outer disk carrier 4 there are formed inner teeth 36 with which the outer teeth 32 of the sliding sleeve 39 can engage to form a positive-lock connection between the outer disk carrier 4 and the cylinder 5 once the frictional connection between the said transmission components has been established.

Here too a first restoring spring 24 acting on the first actuation piston 6 and a second restoring spring 25 help to ensure that the outer disk carrier 4 is first braked to rest and connected with positive locking to the non-rotating components 5, 33, 35, 39, before the first actuating piston 6 can be pressed with a force $F_1$ against the disk pack 8, 9.

Figure 5:
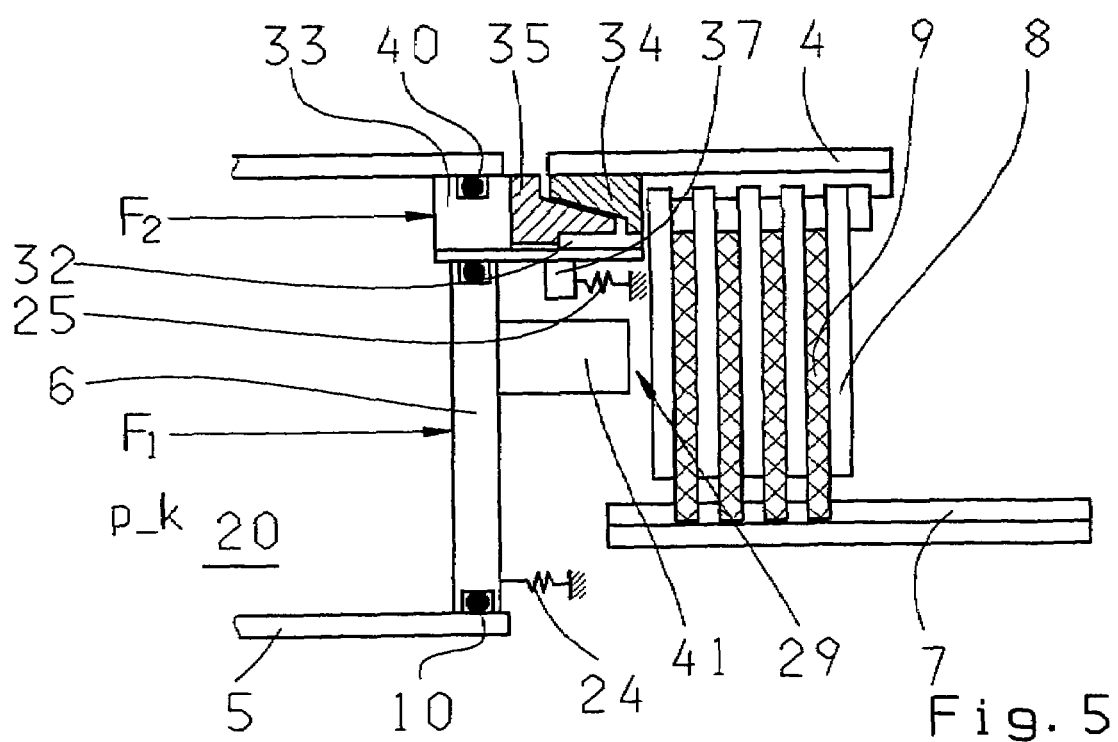
FIG. 5 is an actuation device for a disk brake as in FIG. 4, but in a different actuation condition.

As shown by FIGS. 4 and 5, at its end near the pressure space the second restoring spring 25 engages with a locking device 37 for the first actuation piston 6, which is formed on or attached to the radially inward-facing periphery of the sliding sleeve 39.

FIG. 5 in particular illustrates the condition in which a positive-lock connection has already been formed between the sliding sleeve 39 and the inner teeth 36 on the synchronization area 34 of the inner disk carrier 7. For this, the sliding sleeve 39 has been moved axially to the right to leave free a regulating path of the first actuation piston 6 which covers the clearance 29 between the actuation projection 41 on the first actuation piston 6 and the disk pack 8, 9.

As is shown in particular by a comparison with the situation represented in FIG. 4 before the formation of the positive lock, at this point in time the first actuation piston 6 can only be displaced axially in the direction of the clutch disks 8, 9 taking the sliding sleeve 39 with it.

In another version of the invention, it can be provided that instead of the hydraulic actuation described above, the sliding sleeves can also be actuated electro-mechanically.

In addition, it can be advantageous to detect the adjustment positions of the two actuation pistons or the sliding sleeves by way of sensors and transmit them to a control and regulation unit for the regulation of precisely those control elements.

Likewise, it is possible to arrange a hydrodynamic locking device, which locks when the sliding sleeve has not reached its end position and is only released when a frictional and/or positive locking connection exists between the shifting element components involved.

In another variant of the invention, instead of the synchronization ring described, additional small hydraulically, electro-mechanically, actuated disk clutches are used, which are arranged between the disk carrier and the rotating transmission component or the component fixed to the housing.

The explanations of the invention and its various embodiments make it clear that disk brakes and disk clutches made, according to the invention, or their actuation and synchronization devices, have a number of advantages. Thus, in the disengaged condition such a transmission shifting element has no friction or drag losses, and the dead time between emitting the command to close the shifting element and the actual closing of the clutch or brake can be greatly reduced because of the rapid axial mobility of the second actuation piston and their air clearance of almost zero.

Moreover, thanks to the omission of an otherwise usual restoring cup spring for the single actuation piston of the prior art, it can be assumed that smaller tolerances exist for the adjustable coupling force.

The use of two actuation pistons also has the advantage that since the individual pistons are smaller their regulation path resolution is better and the coupling pressure is all available for the actuation of the clutch.

Another advantage is that since the clutch or brake disks are uncoupled in the disengaged condition, during that operating phase as such no supply of lubricating oil to the shifting element is needed, so that during such intervals the related pump power of an oil pump can be saved.

The switching on and off of this lubricant flow can take place for example by one of the two actuation pistons 18, 27, 33 or by the second actuator 13 in such manner that during their positioning movement a mechanically actuated electric switch is actuated.

Furthermore, as regards the actuation of the clutch or brake the operational reliability is increased, since two actuation elements in all are provided for each shifting element.

Finally, the risk of overspeed errors is reduced by using the invention, since disengaged clutches or brakes also do not have to be brought up to speed by an upward drag process. Besides, transmission clutches and brakes only have to be equipped with the actuation and synchronization means according to the invention when they would otherwise be expected to operate with high drag losses.

Below, with reference to FIG. 6, a shifting sequence of a gearbox constructed, according to the invention, during a traction upshift will be explained.

In the Figure, the time variation of the engine speed n_mot and shifting pressures p_kzu1, p_kab1 in the pressure space 20 of the pressure cylinder 5 described above are depicted for a shifting element to be engaged and a clutch to be disengaged with an actuation device according to the prior art. For comparison, the actuation pressures p_kab2, p_kzu2 of a clutch to be engaged and a clutch to be disengaged, belonging to a synchronization and actuation device according to the invention, are also shown. Furthermore, the upper part of FIG. 5 shows the time variation of a control signal $S_{Mmot}$ to change the engine torque and two shift signals $S_{G1}$, $S_{G2}$ for carrying out the upshift process.

Figure 6:
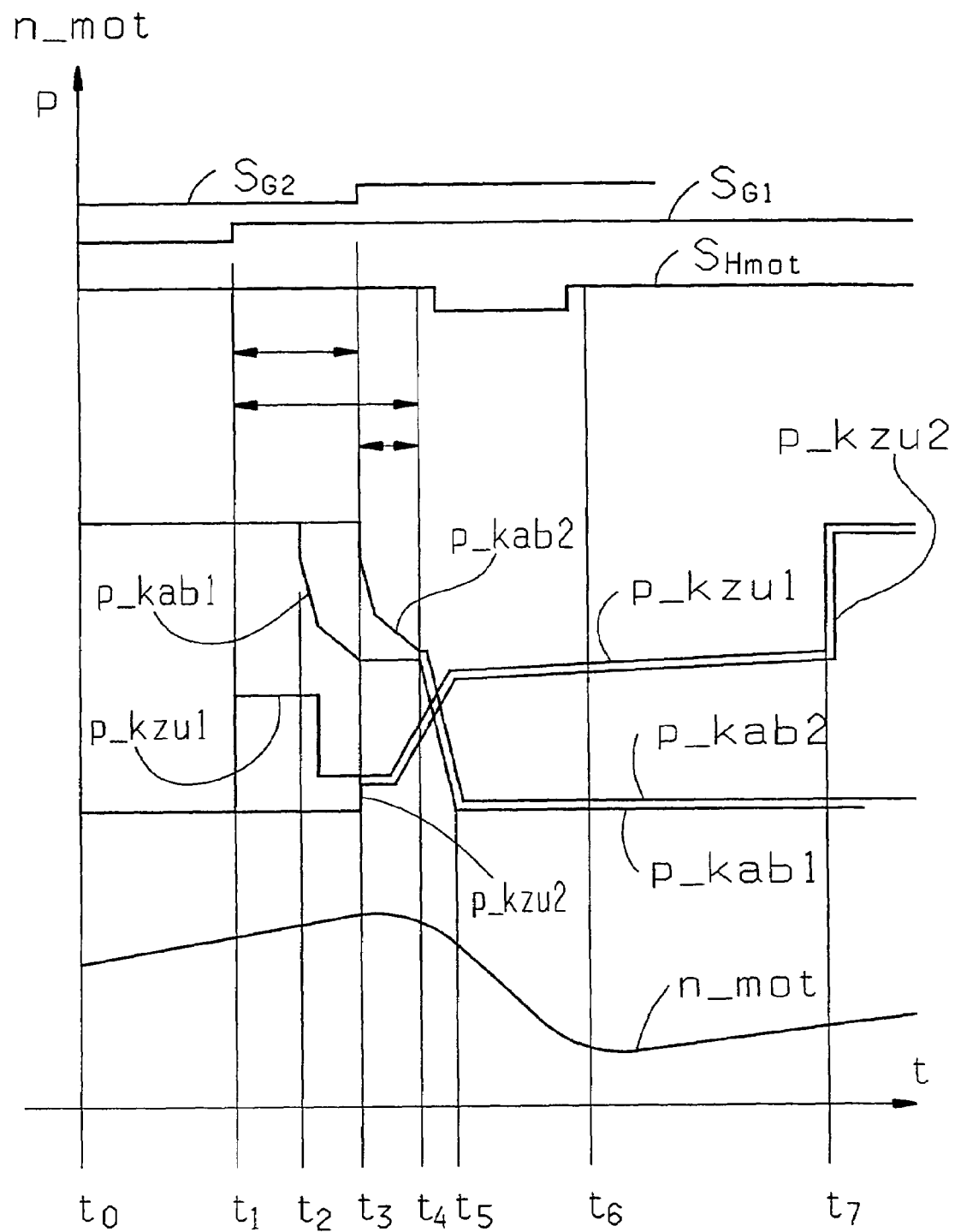
FIG. 6 is a diagram in which the time variation of shift commands for changing the transmission ratio of the gearbox, the engine speed and the shifting pressures in the shifting clutches to be engaged and disengaged is shown.

Starting from a normal vehicle driving situation with no shifting process at time $t_0$, in the case of a conventional gearbox, when initiated by a transmission control unit and/or an actuation command from the vehicle's driver pre-filling of the actuation cylinder 5 of the clutch to be engaged begins at time $t_1$, so that a control pressure p_kzu1 for the actuation cylinder increases as shown in FIG. 6.

Shortly afterwards, at time $t_2$, the actuation pressure p_kab1 in the clutch to be disengaged is reduced, while the pre-filling pressure of the clutch to be engaged falls again when its actuation piston contacts the disk pack of the clutch.

Shortly before time $t_4$ is reached, the control pressure p_kzu1 for pressurizing the clutch disks is increased and essentially at the same time the actuation pressure in the actuator of the clutch to be disengaged is reduced further in the sense of a sliding torque transfer, in such manner that at time $t_5$ the clutch to be disengaged plays no further part at all in the torque transfer path of the gearbox and the clutch to be engaged is sufficiently so for frictional connection to be established between its clutch disks.

In this connection, it should be said that shortly after the time $t_4$, the drive engine of the vehicle is made by a corresponding control signal $S_{Mmot}$ to reduce the torque it is producing for a short time. This torque reduction is reversed again after the torque transfer from the clutch being disengaged to the clutch being engaged, shortly before the time point $t_6$.

At time $t_7$, the pressure in the actuator of the clutch being engaged is finally increased sufficiently for the maximum torque that the engine can deliver to be transmitted completely or the pressure is followed as a function of the transmission input torque in order to ensure torque transfer.

In contrast to this shifting sequence known as such, according to the invention, in the automatic gearbox the pressure variation with time at the shifting elements to be engaged and disengaged is different. In fact, thanks to the combination of the first actuation device for clutch actuation together with the synchronization device and the second actuation device associated therewith, the pre-filling phase of the actuation cylinder of the clutch to be engaged, described above, is omitted.

Since the air clearance in the disk clutch according to the invention is reduced to a value close to zero, immediately after the emission of the shift command $S_{G2}$ at time $t_3$ the actuation pressure p_kzu2 in the control element of the clutch to be engaged can be increased to the level shortly before the first torque transfer and the shifting pressure p_kab2 in the control element of the clutch to be disengaged can be reduced. The subsequent torque transfer then takes place as described above essentially between time points $t_4$ and $t_5$, while the further pressure increase at the clutch being engaged takes place at time $t_7$.

FIG. 6 clearly shows that, according to the prior art, the pre-filling interval for the clutch to be engaged (pressure variation p_kzu1) and the first pressure reduction section (pressure variation p_kab1) for the clutch being disengaged, indicated by the upper double-arrow, is located between times $t_1$ and $t_3$. Precisely during this interval, the gearbox constructed and operated according to the invention reacts more rapidly to a wish to change the transmission ratio.

As is made particularly clear by comparing the shifting pressure variations (p_kzu1, p_kab1), according to the prior art, during the time intervals $t_1$ to $t_4$ (middle double-arrow) with the shifting pressure variations (p_kzu2, p_kab2) during the interval $t_3$ to $t_4$ (lower double-arrow), the clutch can be actuated and thereby the transmission ratio change process can be carried out advantageously rapidly thanks to the fact that the actuation piston is already in its optimum actuation position.

Figure 7:
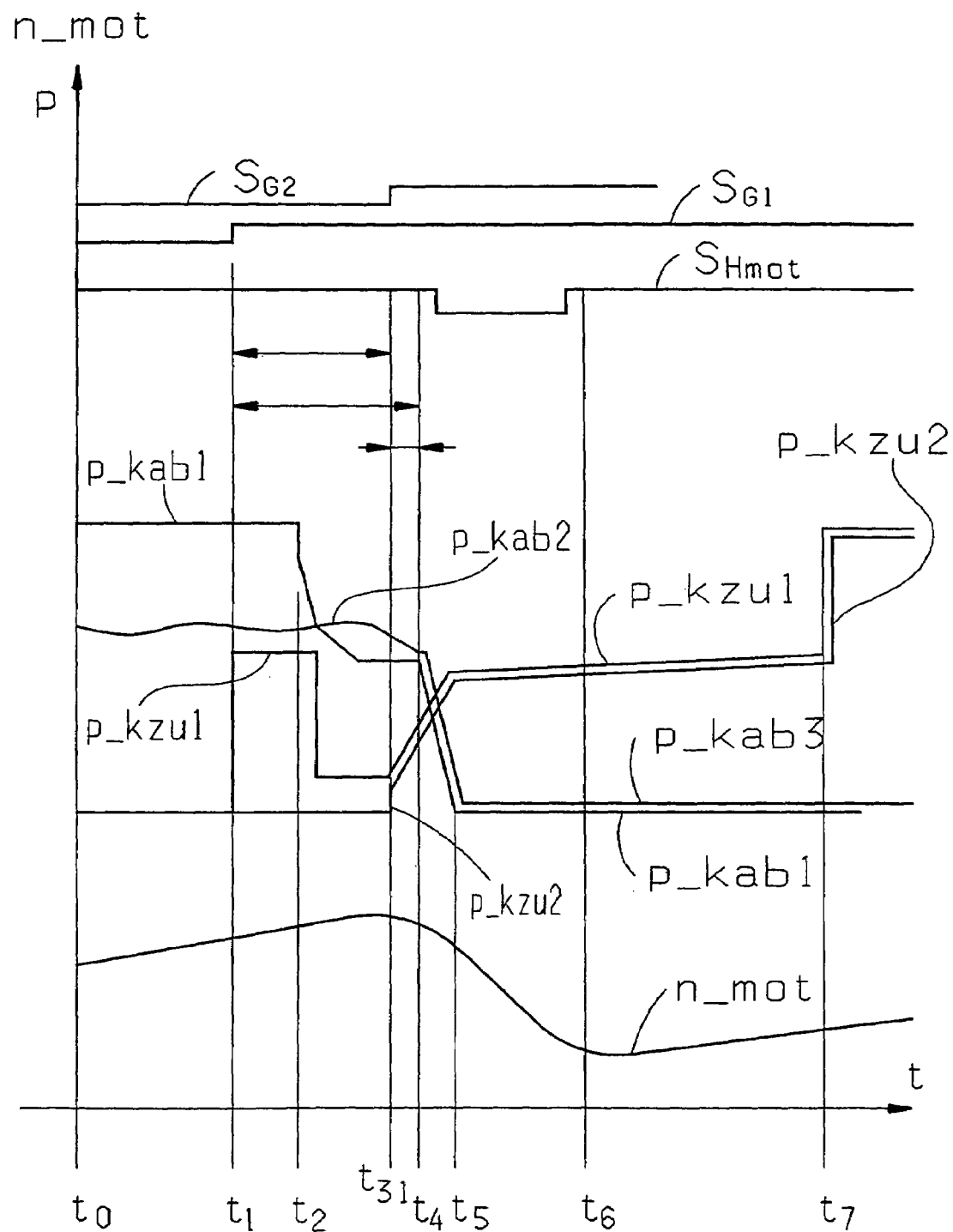
FIG. 7 is a representation as in FIG. 6, but when the clutch to be disengaged is operating at its slip limit.

As shown in FIG. 7, a further reduction of the reaction time of the gearbox to a transmission ratio change command can be achieved by operating the clutch to be disengaged continuously at its slip limit. The actuation pressure p_kab3 needed for this is considerably lower than the pressure p_kab2 in the example embodiment shown in FIG. 6, so that the residual pressure reduction in the actuator of the clutch being disengaged, which begins at time $t_{31}$ and lasts until the beginning of torque transfer at time $t_4$, becomes much shorter than in the aforesaid example.

| Reference numerals |
| --- |
| 1 transmission shifting element/ disk brake |
| 2 synchronization device |
| 3 rotating gearbox component |
| 4 outer disk carrier |
| 5 cylinder |
| 6 actuation piston |
| 7 inner disk carrier |
| 8 outer disks |
| 9 inner disks |
| 10a seal |
| 10b seal |
| 11 synchronization ring |
| 12 synchronization area |
| 13 second actuator |

-continued

| Reference numerals |
| --- |
| 14 sliding sleeve |
| 15 contact ring of the actuation piston |
| 16 first actuator |
| 17 outer teeth |
| 18 second actuation piston |
| 19 sliding sleeve |
| 20 pressure space of the piston- cylinder unit |
| 21 connection element |
| 22 synchronization ring |
| 23 inner teeth |
| 24 first spring |
| 25 second spring |
| 26 synchronization area |
| 27 second piston |
| 28 synchronization area |
| 29 axial clearance |
| 30 seal |
| 31 seal |
| 32 outer teeth |
| 33 second piston |
| 34 synchronization area |
| 35 synchronization ring |
| 36 inner teeth on synchronization area 34 |
| 37 locking device for the first piston 6 |
| 38 circumferential groove on the sliding sleeve |
| 39 sliding sleeve |
| 40 seal |
| 41 projection |

| | |
| --- | --- |
| $F_1$ | actuation force |
| $F_2$ | actuation force |
| $S_{Mmot}$ | control signal to change the engine torque |
| n_mot | engine speed $S_{G1}$ shift signal to carry out a transmission ratio change process (according to the prior art) |
| $S_{G2}$ | shift signal to carry out a transmission ratio change process (according to the invention) |
| p_k | control pressure |
| p_kzu1 | engagement pressure in the shifting element to be engaged, according to the prior art |
| p_kazu2 | engagement pressure in the shifting element to be engaged, according to the invention |
| p_kab1 | disengagement pressure in the shifting element to be disengaged, according to the prior art |
| p_kab2 | disengagement pressure in the shifting element to be disengaged, according to the invention |
| p_kab3 | disengagement pressure in the shifting element to be disengaged, according to a variant of the invention |
| t | time |
| $t_0$-$t_7$ | time points |
| $t_{31}$ | time point |

The invention claimed is:

1. An automatic gearbox for a vehicle, with at least one hydraulically actuated shifting element (1) made as a transmission clutch, which comprises an inner disk carrier (7) and an outer disk carrier (4) on which, respectively, inner disks (9) and outer disks (8) are arranged rotationally fixed but axially displaceable, the inner and the outer disks being arranged alternating, one after another, to form a disk pack which is actuatable by an axial actuation force ($F_1$) of an actuator (16) for engaging the shifting element (1), and in which the outer disk carrier (4) is connected to one of a non-rotating or a rotating first gearbox component and the inner disk carrier (7) is connectable, via a synchronization device (2), to a rotating second gearbox component (3), and the synchronization device (2) is actuatable by a second actuator (13, 18, 27, 33); and the second actuator (13, 18, 27, 33) is a second actuation piston (18), axially guided by a common actuation cylinder (5), and the second actuator (13, 18, 27, 33) together with a first actuation piston (6) pressurizes the inner and the outer disks (8, 9).

2. The automatic gearbox according to claim 1, wherein the synchronization device (2) comprises at least one of a positive-locking element and a frictional element.

3. The automatic gearbox according to claim 2, wherein the frictional element is a synchronization ring (11) with a synchronization area (12) on one of the inner and the outer disk carriers (4).

4. The automatic gearbox according to claim 2, wherein the positive-looking element is a sliding sleeve (14) which is fitted rotationally fixed, but axially displaceable over outer teeth (17) on one of the rotating or non-rotating gearbox component (3) such that once rotational speeds of the fixed and rotating gearbox components (3) equalize, the sliding sleeve can be pushed onto a synchronization area (12) of the inner disk carrier (7) to provide positive locking.

5. The automatic gearbox according to claim 4, wherein the sliding sleeve (14) is actuated by the second actuator (13).

6. The automatic gearbox according to claim 1, wherein the second actuator (13) is formed as a shifting fork of a control positioning device which engages in a circumferential groove (38) of a sliding sleeve (14).

7. The automatic gearbox according to claim 5, wherein one of a common pressure space (20) and respective separate pressure spaces for each of the first and the second actuation pistons are formed by the common actuation cylinder (5) for the first and the second actuation pistons (6, 18, 27, 33).

8. The automatic transmission according to claim 7, wherein the first and the second actuation pistons are actuated by one of a same actuation pressure (p_k) and by different actuation pressures.

9. The automatic gearbox according to claim 1, wherein a first restoring spring (24) is associated with the first actuation piston (6) and a second restoring spring (25) is associated with the second actuation piston (18), on respective sides facing away from a pressure space (20) of the actuation cylinder (5), which rest against a component fixed to a housing when the shifting element (1) is made as a transmission brake, and against a rotating gearbox component when the shifting element (1) is made as a transmission clutch, and a restoring force of the first restoring spring (24) is larger than a restoring force of the second restoring spring (25).

10. The automatic gearbox according to claim 1, wherein a sliding sleeve (19) is guided axially displaceably on inner teeth (23) of the inner disk carrier (7) and is actively connected to and is axially displaceable by the second actuation piston (18) via a connection element (26).

11. The automatic gearbox according to claim 1, wherein a first synchronization area (41) is formed on a radially inward-facing side of the outer disk carrier (4), and a second synchronization area (28), which co-operates with the first synchronization area (41), is formed on an end face of the second actuation piston (27) remote from a pressure space to achieve rotational speed synchronization.

12. The automatic gearbox according to claim 1, wherein a sliding sleeve (39) is fitted axially displaceably on an outer periphery of the first actuation piston (6), which is actively connected to the second actuation piston (33) arranged radially outside the sliding sleeve (39) and in the same common actuation cylinder (5) as the first actuation piston (6).

13. The automatic gearbox according to claim 12, wherein an outer periphery the sliding sleeve (39) has axially directed teeth (32) on which a synchronization ring (35) is arranged in an axially displaceable but rotationally fixed manner.

14. The automatic gearbox according to claim 1, wherein an axially directed toothed area (36) is formed on a synchronization area (34) of an inner circumference of the outer disk carrier (4) in which outer teeth (32) of a sliding sleeve (39) can engage via positive locking.

15. The automatic gearbox according to claim 1, wherein a locking device (37) is formed on an inner circumference of a sliding sleeve (39) which only allows axial displacement of the first actuation piston (6), when an equalized rotational speed is achieved by the synchronization device (34, 35) and a positive-lock connection is formed between the sliding sleeve (39) and the outer disk carrier (4).

16. The automatic transmission according to claim 1, wherein a projection (41), extending axially away from a pressure space (20) of a piston-cylinder arrangement (5, 6, 33), is formed on the first actuation piston (6) by which one of the inner and the outer disks (8, 9) of the shifting element (1) are acted upon by an actuation force ($F_1$) of the first actuation piston (6).

17. The automatic gearbox according to claim 1, wherein a hydraulic slider, which is actuated by the second actuator (13), is mechanically actuate by an electric switch for turning a flow of lubricant one of on and off.

18. An automatic gearbox for a vehicle, with at least one hydraulically actuated shifting element (1) made as a transmission clutch, which comprises an inner disk carrier (7) and an outer disk carrier (4) on which, respectively, inner disks (9) and outer disks (8) are arranged rotationally fixed but axially displaceable, the inner and the outer disks being arranged alternating, one after another, to form a disk pack which is actuatable by an axial actuation force ($F_1$) of an actuator (16) for engaging the shifting element (1), and in which the outer disk carrier (4) is connected to a non-rotating first gearbox component and the inner disk carrier (7) is connectable, via a synchronization device (2), to a rotating second gearbox component (3), and the synchronization device (2) is actuatable by a second actuator (13, 18, 27, 33); and a hydrodynamic locking device is provided for a first actuation piston (6), which is released when one of a frictional positive-lock connection exists between the second gearbox component of the shifting element that is to be immobilized and the first gearbox component fixed to the housing.

19. An automatic gearbox for a vehicle, with at least one hydraulically actuated shifting element (1) made as a transmission clutch, which comprises an inner disk carrier (7) and an outer disk carrier (4) on which, respectively, inner disks (9) and outer disks (8) are arranged rotationally fixed but axially displaceable, the inner and the outer disks being arranged alternating, one after another, to form a disk pack which is actuatable by an axial actuation force ($F_1$) of an actuator (16) for engaging the shifting element (1), and in which the outer disk carrier (4) is connected to a non-rotating first gearbox component and the inner disk carrier (7) is connectable, via a synchronization device (2), to a rotating second gearbox component (3), and the synchronization device (2) is actuatable by a second actuator (13, 18, 27, 33); and an electric switch is mechanically actuated, for turning a flow of lubricant one of on and off, by at least one of first and second actuation pistons (18, 27, 33) and by the second actuator (13).

* * * * *